United States Patent
Ge

(10) Patent No.: US 8,930,891 B2
(45) Date of Patent: Jan. 6, 2015

(54) METHOD FOR VISUAL MANIPULATIONS OF ALL KINDS OF PROGRAMMING OBJECTS

(71) Applicant: David Wei Ge, Kirkland, WA (US)

(72) Inventor: David Wei Ge, Kirkland, WA (US)

( * ) Notice: Subject to any disclaimer, the term of this patent is extended or adjusted under 35 U.S.C. 154(b) by 63 days.

(21) Appl. No.: 13/758,527

(22) Filed: Feb. 4, 2013

(65) Prior Publication Data
US 2014/0223413 A1    Aug. 7, 2014

(51) Int. Cl.
*G06F 9/44* (2006.01)
(52) U.S. Cl.
CPC ........................................ *G06F 8/34* (2013.01)
USPC ........... 717/105; 717/100; 717/106; 717/108; 717/109; 717/116; 715/200
(58) Field of Classification Search
None
See application file for complete search history.

(56) References Cited

U.S. PATENT DOCUMENTS

| | | | | |
|---|---|---|---|---|
| 6,253,240 B1* | 6/2001 | Axberg et al. | ................ | 709/223 |
| 6,300,948 B1* | 10/2001 | Geller et al. | .................. | 715/866 |
| 6,658,625 B1* | 12/2003 | Allen | ............................ | 715/236 |
| 7,143,042 B1* | 11/2006 | Sinai et al. | ................. | 704/270.1 |
| 2003/0037310 A1* | 2/2003 | Ge | ................................ | 717/113 |
| 2003/0058277 A1* | 3/2003 | Bowman-Amuah | .......... | 345/765 |
| 2004/0006765 A1* | 1/2004 | Goldman | ...................... | 717/116 |
| 2004/0143822 A1* | 7/2004 | Jager et al. | .................... | 717/140 |
| 2006/0129976 A1* | 6/2006 | Brand et al. | .................. | 717/109 |
| 2006/0161886 A1* | 7/2006 | Ge | ................................ | 717/106 |
| 2006/0206866 A1* | 9/2006 | Eldrige et al. | ................ | 717/122 |
| 2007/0288887 A1* | 12/2007 | Pepin et al. | ................... | 717/105 |
| 2009/0024987 A1* | 1/2009 | Forster et al. | ................. | 717/141 |
| 2009/0234804 A1* | 9/2009 | Whitechapel et al. | ............ | 707/3 |
| 2010/0235810 A1* | 9/2010 | Campbell et al. | ............. | 717/106 |
| 2012/0137268 A1* | 5/2012 | Dattke | ......................... | 717/105 |
| 2013/0066622 A1* | 3/2013 | Farkas et al. | .................... | 703/22 |

* cited by examiner

*Primary Examiner* — Chameli Das
(74) *Attorney, Agent, or Firm* — David Wei Ge

(57) ABSTRACT

A method of enabling an Integrated Development Environment to visually manipulate any software objects, not just specifically designed object, comprises the steps of using a design-time software class to represent properties, methods, events, constructor, constructor parameters and type parameters of programming entities in an IDE, using a name-type dictionary to add any software types to a toolbox, using action-event assignments for codeless visual programming.

12 Claims, 10 Drawing Sheets

METHOD FOR VISUAL MANIPULATIONS OF ALL KINDS OF PROGRAMMING OBJECTS

TECHNICAL FIELD

Embodiments of the present invention relate to the field of rapid software development via visual object manipulation. In particular, embodiments of this invention relate to an approach of enabling an Integrated Development Environment (IDE) to be able to visually manipulate any software classes, not just specifically designed classes, as state-of-art IDE's require. Thus it is possible to create a codeless visual programming system which uses existing software libraries as its programming entities.

BACKGROUND ART

State-of-art IDE systems allow developers visually manipulate programming entities, by setting properties visually and by building GUI visually, thus providing rapid software development. FIG. 1 shows a typical MICROSOFT® VISUAL STUDIO® user interface showing a form designer 101, a button 102 on the form, and a timer component 103. The form, the button and the timer are all programming entities. Since the timer component 103 does not have a visual UI, the form designer put it on a component pane, not on the form. Visually setting a property value is by presenting a list of properties for the developer to identify a property and then enter desired value for the property, in a What You See Is What You Get manner. FIG. 2 shows properties of a button in a property grid 201, setting BackColor property 202 can be done by clicking a color from color selector 203. In comparison, setting a property value by "text code" is by writing one or more lines of code. It is the responsibility of the developer to correctly identify desired property by code and to correctly use code to represent desired property value, for example, use RGB values to represent a color. When visually manipulating a programming entity, as shown in FIG. 2, it is the responsibility of the IDE to correctly identify properties and store correct property values when the developer enters the values, in a What You See Is What You Get manner, as in FIG. 2, the IDE has to form color RGB values from the color the developer clicks.

In a state-of-art IDE, a component, which can be visually manipulated, is a specifically designed software class. For example, in JAVA® (JAVA is a registered trademarks of Sun Microsystems, Inc) language, such a component is a Java-Bean or a JComponent (Krill, Paul (Dec. 11, 2007). "NetBeans to pick up where Sun Java Studio leaves off". *Java World*. Retrieved Jul. 9, 2010.). All Swing components are derived from JComponent. WindowsBuilder is a visual tool for toolkit-specific components: https://developers.google.com/java-dev-tools/wbpro/userinterface/palette. Visual Swing for Eclipse is a visual tool for working on Swing components: http://code.google.com/p/visualswing4eclipse/. In Microsoft®.Net Framework®, such a component is a class implementing IComponent interface and a parameter-less constructor, see http://msdn.microsoft.com/en-us/library/fw694kde.aspx for more details of such requirements. Since most software classes do not meet such requirements, most classes in software libraries cannot be visually manipulated by a state-of-art IDE, and cannot take advantages of visual object manipulations by state-of-art IDE's. A state-of-art IDE only allows adding such specifically designed components to its toolbox. For example, if we try to add a class not so designed to MICROSOFT® VISUAL STUDIO® toolbox, an error message box will appear as shown in FIG. 4. See http://www.microsoft.com/visualstudio/eng/products/visual-studio-overview for information on MICROSOFT® VISUAL STUDIO®. Mono™ (Mono is a registered trademark of Novell®) IDE http://www.mono-project.com/Main_Page) works on multiple platforms, it has the same restrictions on visually-manipulate-able objects as MICROSOFT® VISUAL STUDIO® does.

Visually manipulating of software objects is the core of a rapid software development IDE. Such an IDE allows visual selection of an object; presents its properties and events; allowing modifying object properties interactively; allowing selected events to be handled. These capabilities form the major differences between a state-of-art visual programming IDE and an older text-editor only IDE. Because of the restrictions on visually-manipulate-able components, the benefits of visual object manipulations of a state-of-art visual programming IDE are limited to only a small percentage of existing software classes. When a not-visually-manipulate-able component is used, a state-of-art IDE resorts to old-style text-editor approach and loses the benefits of visual object manipulations.

It is desirable to remove the restrictions placed on a class for it to be a visually-manipulate-able component, so that all existing software classes may take advantages of visual object manipulations.

SUMMARY OF INVENTION

Technical Problem

For a state-of-art IDE to be able to provide visual manipulations of an object, the IDE needs to interact with the object being manipulated. For example, it needs a way to identify the object, it needs to serialize and de-serialize the object, it may need to attach some designer information to the object while working with it, etc. It is not obvious that such requirements from a visual programming IDE may be fulfilled without built-in code from the object being manipulated. Thus, state-of-art IDE's classify software objects as visually-manipulate-able objects, which have IDE-interaction code built-in; and not-visually-manipulate-able objects, which do not have IDE-interaction code built-in.

Some solutions provided by state-of-art IDEs are using proprietary objects. LabView® LabView is a registered trademark of NATIONAL INSTRUMENTS) http://www.ni.com/labview/) is a successful example. There are many other systems going this direction, such as Axxun® (Axxun is a registered trademark of Axxun Inc.): http://www.axxun.com/home.aspx, SOFTWIRE® (SOFTWIRE is a registered trademark of Softwired Technologies, Inc): http://www.softwiretechnology.com/. Systems going this direction are quite successful if they are limited to specific domain because usually they provide lots of domain specific objects which provide powerful domain specific features. If they are for generic purpose programming then not a system is successful because their proprietary objects limit their programming functionality.

Solution to Problem

Embodiments of this invention provide processes by which an IDE may put any software classes into a toolbox and visually manipulate any kinds of software objects being programmed, as if all software classes are visually-manipulate-able components. In particular, the embodiments of the processes use a specifically designed class to represent all not-visually-manipulate-able types in VISUAL STUDIO®

Toolbox, and use a dictionary to keep track of not-visually-manipulate-able types added to the toolbox. Thus any kinds of software classes can be added to a MICROSOFT® VISUAL STUDIO® toolbox, not just software classes implementing IComponent interface and parameter-less constructors. In particular, the processes separate the object creation from the object manipulations, making it possible to associate IDE design time information with software objects which are not designed to take the design time information. In particular, the embodiments of the processes use a specially designed object to represent every not-visually-manipulate-able object in IDE; the special object delegates to the IDE the properties, methods and events of the object it represents. Thus the embodiments of the processes allow using MICROSOFT® VISUAL STUDIO® Designer to visually manipulate any kinds of software objects being programmed, not just objects implementing IComponent interface and parameter-less constructors. Thus, extending MICROSOFT VISUAL STUDIO functionality of visual object manipulations to all objects, not just objects implementing IComponent interface and parameter-less constructors.

Advantageous Effects of Invention

By implementing this invention, an IDE may extend its ability of rapid and visual programming to all kinds of objects, not just special objects. Object developers do not have to worry about adding code into objects so that the objects may be visually-manipulated by IDE's. By overcoming a barrier between "visually-manipulate-able" and "not-visually-manipulate-able" objects, it is possible to do codeless programming using objects from any software libraries an IDE supports.

BRIEF DESCRIPTION OF DRAWINGS

The embodiments of this invention are listed in attached computer programs in C#. The drawings presented here are not for the purpose of how to implement this invention. Rather, they are screenshots for the purpose of understanding this invention and its background. Some drawings also show how this invention is used.

FIG. 4 shows an error message generated by MICROSOFT VISUAL STUDIO when trying to add most software classes to its toolbox. It demonstrates the restrictions of MICROSOFT VISUAL STUDIO.

DESCRIPTION OF EMBODIMENTS

The embodiments of the invention are presented in C#. The source code is submitted as computer program listing. The source code contents are referenced below by class declarations. The source code runs on MICROSOFT® WINDOWS® operating system and .NET FRAMEWORK®, for extending MICROSOFT® VISUAL STUDIO®. The following terms appearing in paragraphs for describing embodiments are registered trademarks of Microsoft Corporation: Microsoft, Visual Studio, .Net Framework. To avoid distractions when reading those embodiment descriptions these terms are not capitalized and trademark mark is omitted. But the nature of the marks is duly respected.

For MICROSOFT VISUAL STUDIO to visually manipulate an object, the object must implement IComponent interface so that MICROSOFT VISUAL STUDIO may attach design time code into it for interactions and communications between the object and MICROSOFT VISUAL STUDIO. Only classes implementing IComponent can be added to the toolbox in VISUAL STUDIO. By implementing this invention, such limitations are removed. Removing such limitations makes it possible for a codeless programming since all software objects may be visually manipulated without resorting to text coding.

MICROSOFT VISUAL STUDIO provides interfaces for users to extend its functionality. See http://visualstudiogallery.msdn.microsoft.com/ for more information on extending MICROSOFT VISUAL STUDIO. The embodiments of this invention build on VISUAL STUDIO extensibility.

Example 1

Source Code—Public Class TypeMap: Dictionary<String, Type>

Figure 1:
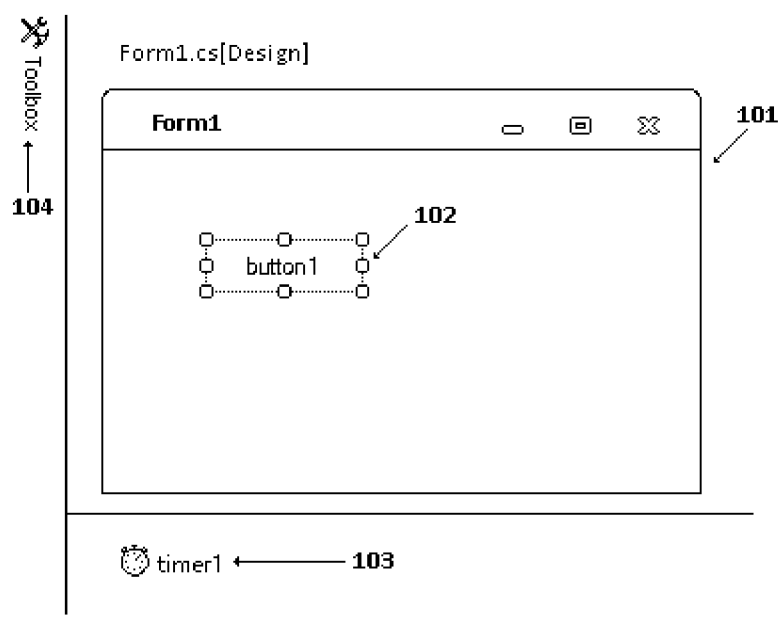
FIG. 1 shows a typical user interface of MICROSOFT VISUAL STUDIO, as a state-of-art integrated development environment. It provides a platform for the embodiments of this invention via VISUAL STUDIO Extensibility interfaces.
Figure 2:
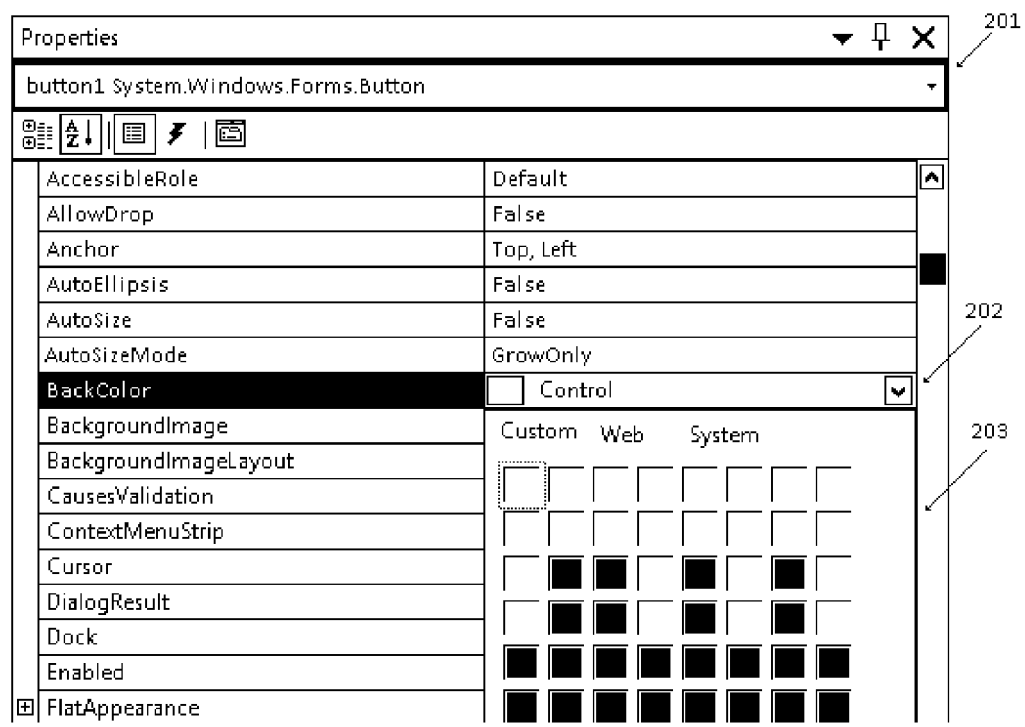
FIG. 2 shows a visual property setting approach provided by Microsoft®.Net Framework®.
Figure 3:
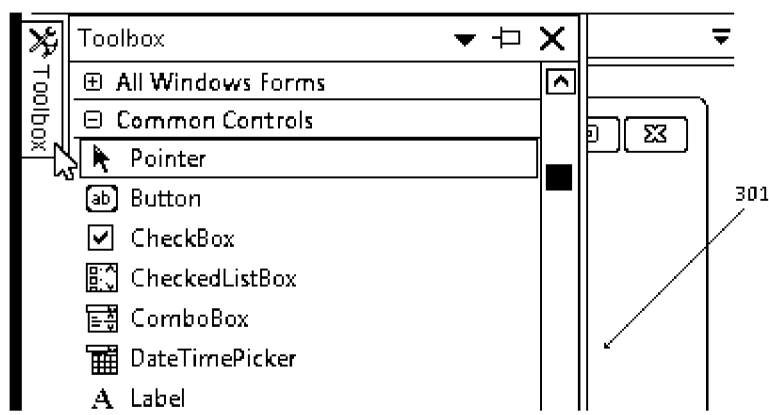
FIG. 3 shows a toolbox provided by Microsoft®.Net Framework®. The embodiments of this invention remove restrictions on the toolbox.
Figure 4:
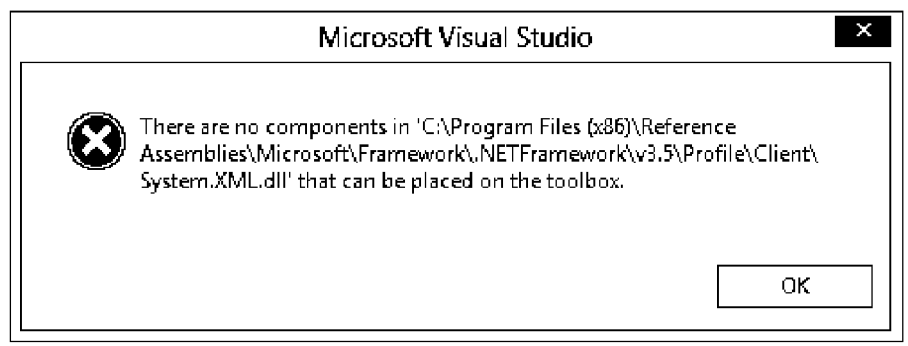
FIG. 4 shows such restrictions.
Figure 5:
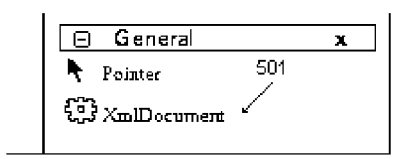
FIG. 5 shows that on implementing this invention, a class, XmlDocument, from Microsoft®.Net Framework®, is added to the VISUAL STUDIO toolbox. Without implementing this invention, adding XmlDocument to the toolbox will cause an error shown in FIG. 4. After implementing this invention, all classes can be added to the toolbox.

The process in Claim 3 involves a dictionary of types. An embodiment of such a dictionary can be implemented in C# as shown by class TypeMap. The AddType method of TypeMap is supposed to be used by an IDE when adding a "not-visually-manipulate-able" type to a toolbox. The AddType method generates a unique string as the key to the type. The IDE does not add the type to the toolbox because each IDE might have its own restrictions on which types can be added to its toolbox. For example, Visual Studio may only add those types to its toolbox, which implement IComponent interface and have parameter-less constructors. The embodiments of this invention use a special object, XClass, for an IDE to add it to its toolbox, representing any types. The IDE adds XClass to the toolbox and uses the AddType method to get a unique string and display the string for the new toolbox item to uniquely identify each type in the toolbox. The user of the IDE also identifies types in the toolbox by the string returned by method AddType since the string is displayed in the toolbox for each type. FIG. 5 shows that class XmlDocument 501, which is from Microsoft .Net Framework, is added to Visual Studio toolbox. Class XmlDocument does not implement IComponent; a state-of-art IDE cannot add it to Visual Studio toolbox. When the user selects a toolbox item to create a new object instance, the IDE uses the toolbox item display string as the key to get the type the user wants from the dictionary. An XClass instance is created by the IDE. The type found in the dictionary is passed to the XClass instance. The IDE can always visually manipulate the instance of XClass because its implementation meets the requirements from the IDE. An example of embodiment of XClass will be provided below.

Example 2

Source Code—Public Class XClass: IComponent, ICustomTypeDescriptor

The process in Claim 2 involves a special object, XClass. An embodiment of XClass is implemented in C# to satisfy requirements from Visual Studio to make it visually manipulate-able by Visual Studio: implementing IComponent interface and implementing a parameter-less constructor. The developer visually manipulates "not-visually-manipulate-able" objects through visually manipulating XClass objects. The ObjectType property of the embodiment is the "object-type" referred to in Claim 2. The Constructor property of the embodiment is the constructor referred to in Claim 2. The ConstructorParameterValues property of the embodiment is the values for the constructor parameters referred to in Claim 2. The PropertyValues property of the embodiment is the property values referred to in Claim 2. The TypeParameters property of the embodiment is the type parameters for the ObjectType if the ObjectType is a generic type definition.

The process in Claim 4 uses XClass to make not-visually-manipulate-able object manipulate-able. When a user selects a toolbox item to create an object instance, the IDE creates an object instance of the corresponding toolbox item. If the new object instance is an XClass then the IDE uses the toolbox item display string as the key to lookup a type from the TypeMap and sets the ObjectType property of the new XClass instance to the type found through TypeMap. If the ObjectType is a generic type definition then the IDE shows a dialogue to allow the user to select type parameters. The selected type parameters are saved in the TypeParameters property of the embodiment of XClass. If the ObjectType contains more than one constructor then the IDE shows a dialogue box to allow the user to select a constructor. The selected constructor is assigned to the Constructor property of the embodiment of XClass. If the ObjectType has only one constructor with parameters, or if the selected constructor has parameters, then the IDE allows the user to specify parameter values and save the values in the ConstructorParameterValues property of the embodiment of XClass.

Figure 7:
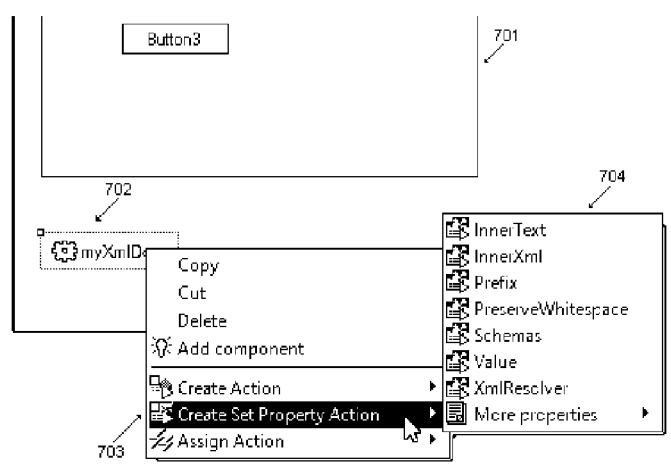
FIG. 7 shows a visual property selection process for a "not-visually-manipulate-able" object, as part of visual object manipulation processes from within MICROSOFT VISUAL STUDIO, after implementing this invention.

The embodiment of XClass has GetProperties methods as examples of implementing a process in Claim 5. This example of implementation of GetProperties returns a collection of properties which consists of 4 parts. Part 1 is formed by properties of ObjectType; part 2 is formed by type parameters of ObjectType if ObjectType is a generic type definition; part 3 is one property for specifying constructor if more than one constructor is available; part 4 is formed by constructor parameters if the selected constructor has parameters. Note that GetProperties methods are members of ICustomTypeDescriptor interface. Such implementation makes all parts of properties appear as XClass's properties for Microsoft Visual Studio. For other IDE or for other languages, such as Java, there could be other implementation considerations. IDE and language specific solutions and processes are not covered by this invention. The embodiments presented here are for Microsoft Visual Studio and programming on the .Net Framework platform. The IDE may use method GetProperties to present a property-selection list to the user, as an example of implementing the process of Claim 9. In FIG. 7, an XClass instance 702 is under a form designer 701, representing a XmlDocument instance. The developer right-click the XClass instance 702; select menu "Create Set Property Action" 703; the IDE uses GetProperties of XClass to form properties menu items 704.

Figure 6:
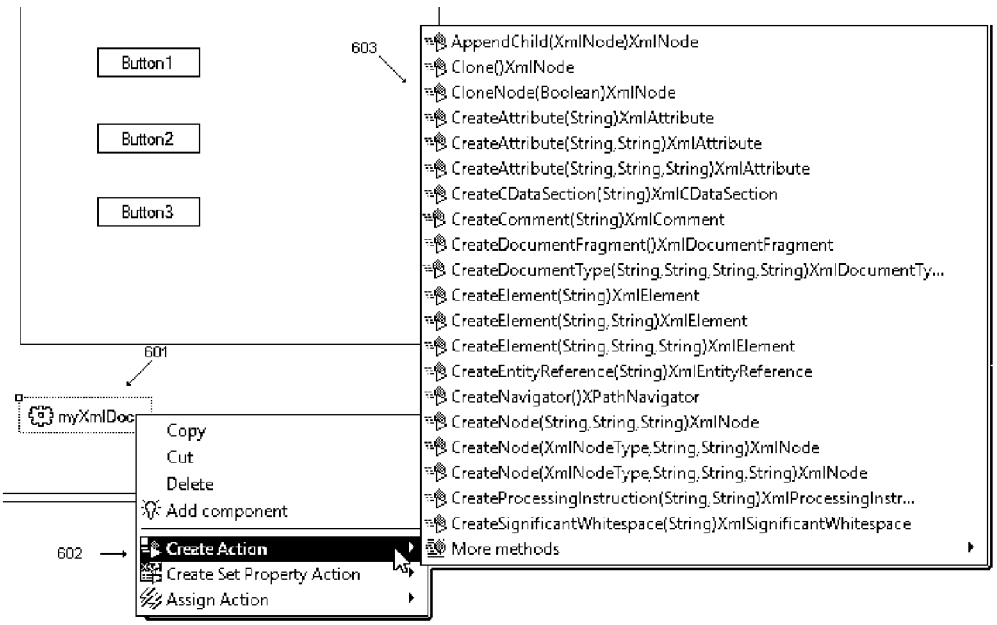
FIG. 6 shows a visual method selection process for a "not-visually-manipulate-able" object, as part of visual object manipulation processes from within MICROSOFT VISUAL STUDIO, after implementing this invention.

The embodiment of XClass has a GetMethods method as an example of implementing a process in Claim 7. The GetMethods method returns an array of MethodInfo objects by calling GetMethods method of ObjectType. The IDE may use this method to present a method-selection list. Note that the method list contains methods of ObjectType, not methods of XClass, even though the user is manipulating an XClass instance through the IDE. FIG. 6 shows that methods of XmlDocument are presented to the developer in a Visual Studio IDE extended by the embodiments of this invention. In FIG. 6, the developer right-click on an instance of XClass 601 representing an instance of XmlDocument; the developer selects context menu "Create Action" 602; methods from XmlDocument are listed as menu item 603.

Figure 8:
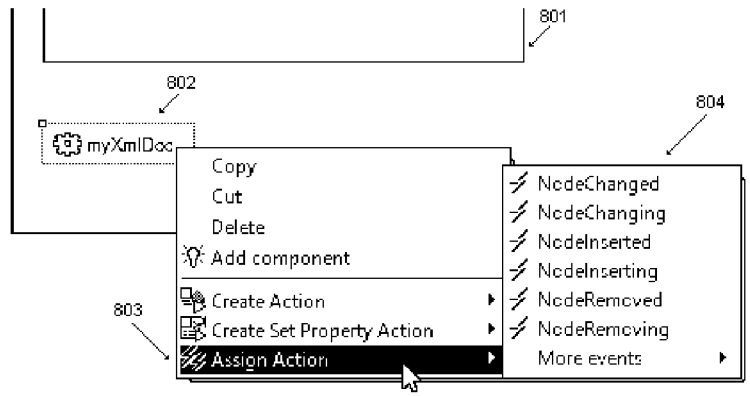
FIG. 8 shows a visual event selection process for a "not-visually-manipulate-able" object, as part of visual object manipulation processes from within MICROSOFT VISUAL STUDIO Microsoft, after implementing this invention.
Figure 9:
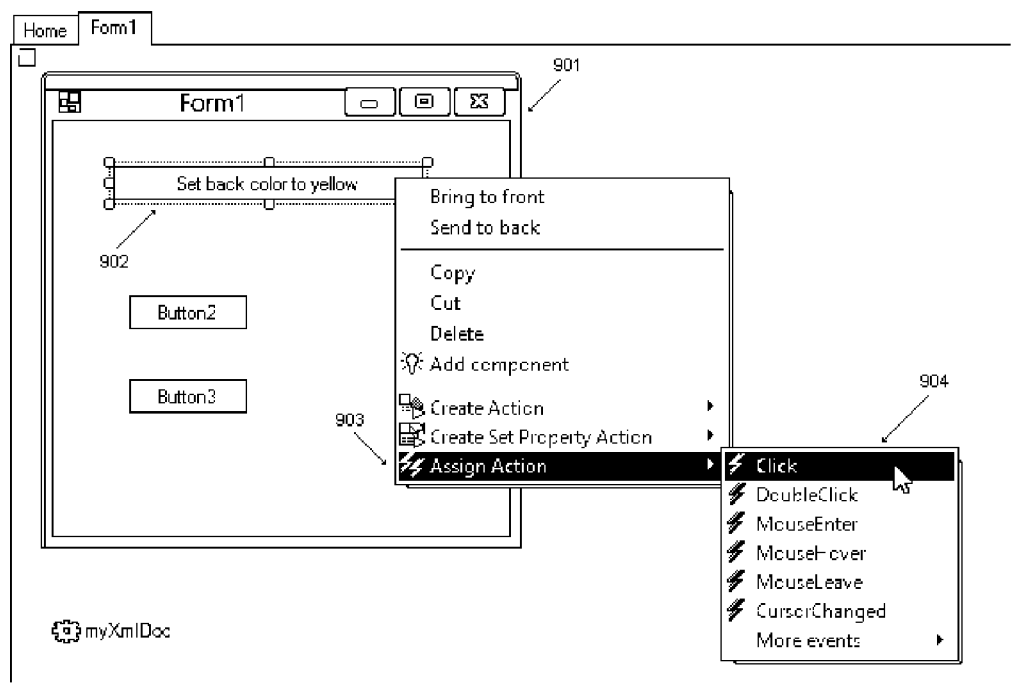
FIG. 9 through FIG. 14 present a process of codeless visual programming by action-event assignment. The sample programming task is that when a button is clicked by a user, the form's background color changes to yellow.
Figure 10:
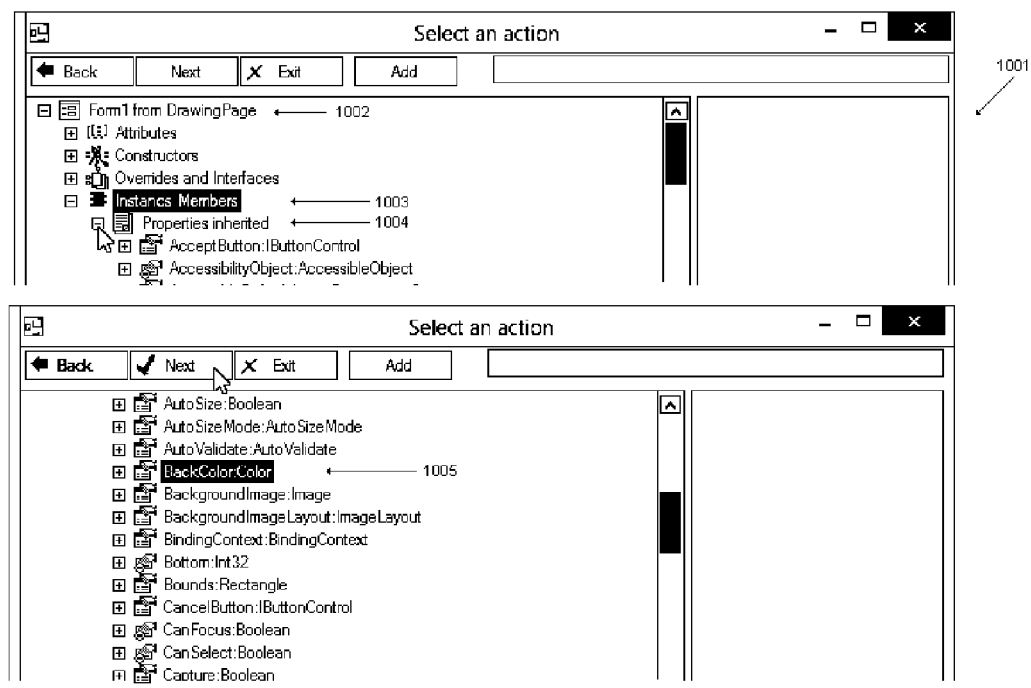
Figure 11:
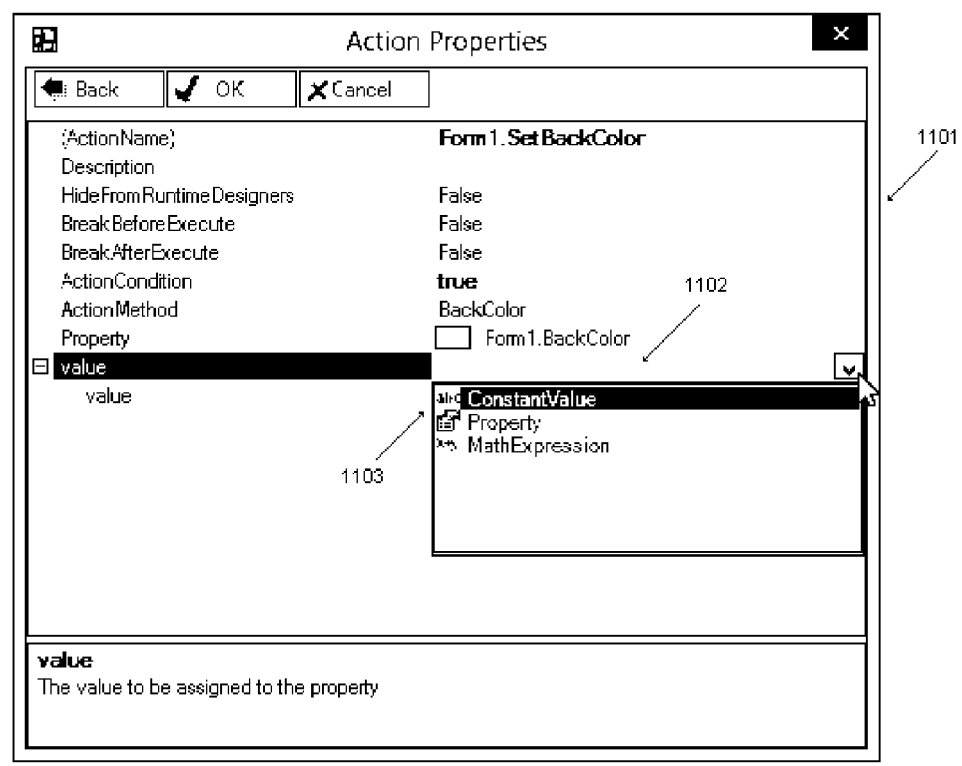
Figure 12:
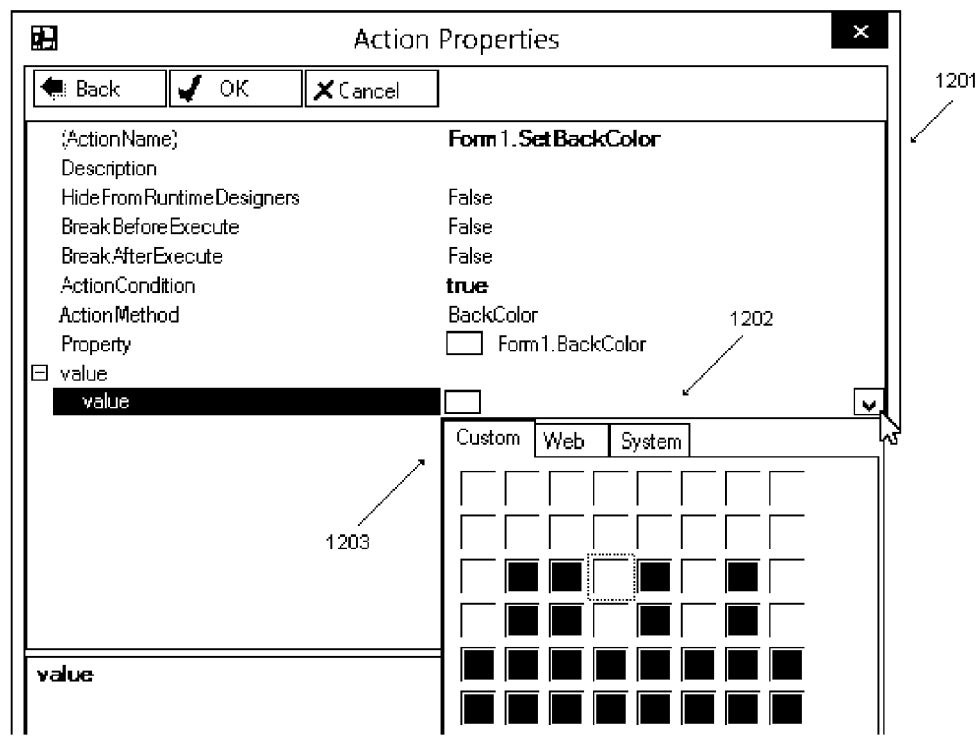
Figure 13:
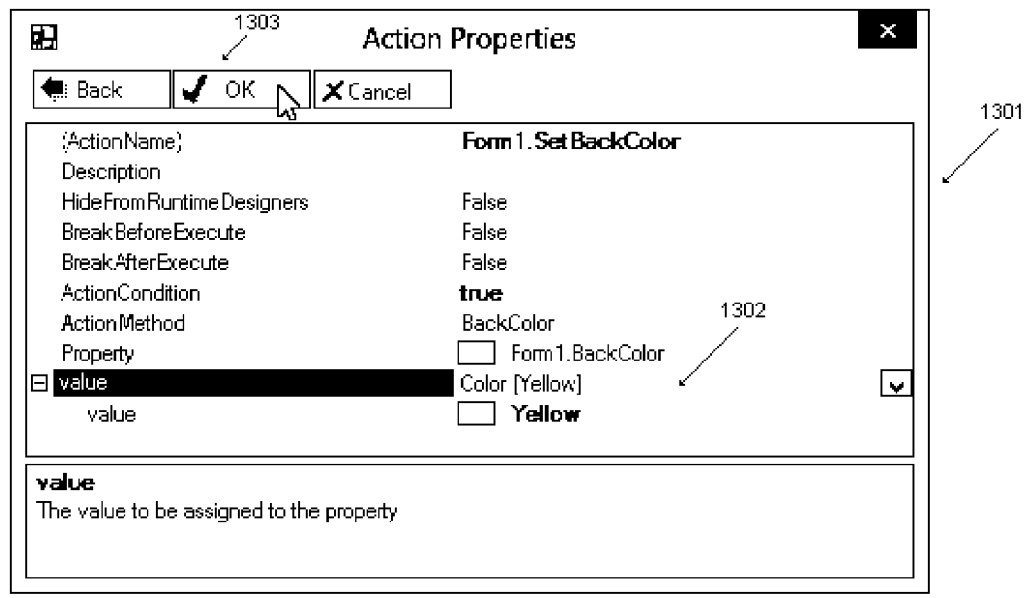

The embodiment of XClass has GetEvents methods and a GetEventList method as examples of implementing a process in Claim 8. The GetEvents methods return a collection of EventDescriptor objects by using TypeDescriptor to get event descriptors from ObjectType; method GetEventList returns an array of EventInfo objects by calling GetEvents of ObjectType. The IDE may use these methods to present event-selection lists. Note that the event lists contains events of ObjectType, not events of XClass, even though the user is manipulating an XClass instance through the IDE. In FIG. 8, an XClass instance 802 is under a form designer 801. The developer right-click on the instance of XClass 802 representing an instance of XmlDocument; the developer selects context menu "Assign Action" 803; events from XmlDocument are listed as menu item 804.

Example 3

Source Code—Class PropertyDescriptorInfo: PropertyDescriptor

The process of Claim 6 saves and loads "object-property-values" as a programming process. Parts of "object-property-values" are values for properties of "object type". The embodiment of XClass uses property PropertyValues, which is a dictionary, to hold values for properties of "object type"; XClass uses class PropertyDescriptorInfo to turn properties of ObjectType into properties of XClass; through PropertyDescriptorInfo the IDE may let developers visually edit the values of properties of "object type"; through PropertyDescriptorInfo the values of properties of "object type" are saved to PropertyValues of XClass.

Example 4

Source Code—Class PropertyDescriptorConstructor: PropertyDescriptor

The process of Claim 6 saves and loads "object-property-values" as a programming process. One value of "object-property-values" is a constructor of "object type". The embodiment of XClass uses property Constructor, which is a ConstructorInfo, to hold value for it; XClass uses class PropertyDescriptorConstructor to allow the developers to select a constructor from constructors of ObjectType; through PropertyDescriptorConstructor the constructor selection is saved to Constructor property of XClass.

Example 5

Source Code—Class PropertyDescriptorParam: PropertyDescriptor

The process of Claim 6 saves and loads "object-property-values" as a programming process. Parts of "object-property-values" are values for constructor parameters of "object type". The embodiment of XClass uses property ConstructorParameterValues, which is a dictionary, to hold values for constructor parameters of "object type"; XClass uses class PropertyDescriptorParam to turn constructor parameters into properties of XClass; through PropertyDescriptorParam the IDE may let developers visually edit the values of constructor of "object type"; through PropertyDescriptorParam the values of constructor of "object type" are saved to ConstructorParameterValues of XClass.

Example 6

Source Code—Class PropertyDescriptorTypeParam: PropertyDescriptor

The process of Claim 6 saves and loads "object-property-values" as a programming process. Parts of "object-property-values" are values for type parameters of "object type", if "object type" is a generic type definition. The embodiment of XClass uses property Type Parameters, which is a dictionary, to hold values for type parameters of "object type"; XClass uses class PropertyDescriptorTypeParam to turn type parameters into properties of XClass; through PropertyDescriptorTypeParam the IDE may let developers visually select type parameters of "object type"; through PropertyDescriptorTypeParam the values of type parameters of "object type" are saved to TypeParameters of XClass.

Example 7

Source Code—Public Class Action: IComponent, ICustomTypeDescriptor

The process in Claim 10 involves using object instances for handling events. An embodiment of said object instances is class Action in C#. An embodiment of XClass as shown in example 2 uses a property EventHandlers to hold a dictionary of event to Action list mapping.

The process in Claim 11 involves Action Condition, Action Method, Action parameters and Action Return value. The embodiment of Action uses a Condition property to hold action condition. The Condition property is a CodeDomSerializer object. The embodiment of Action has an ActionMethod property, which is a MemberInfo object. The embodiment of Action has a ParameterValues property, which is an array of CodeDomSerializer objects. The embodiment of Action has a ReturnValue, which is a CodeDomSerializer object. The ReturnValue represents a variable to receive method return value. Using of CodeDomSerializer makes it easy to save and load Action object and compile or execute the Action. Other forms of embodiments can be, for example, XML, ISerializable object with proprietary formats, etc.

The process of Claim 12 involves an instance method or a static method for an action. The ActionMethod of the embodiment of Action can be a MethodInfo object, which is derived from MemberInfo. A MethodInfo may have parameters; the values for the parameters are hold by the embodiment of Action on property ParameterValues. A MethodInfo may have a return value. The embodiment of Action has a property ReturnValue to pass method return value to a variable.

The process of Claim 13 involves an instance property or a static property. The ActionMethod of the embodiment of Action can be a PropertyInfo, which is derived from MemberInfo. The property ParameterValues of the embodiment of Action contains a single array item representing the value to be passed to the property represented by PropertyInfo.

The process of Claim 14 involves an instance event or a static event. The ActionMethod of the embodiment of Action can be an EventInfo, which is derived from MemberInfo. An EventInfo may have parameters; the values for the parameters are hold by the embodiment of Action on property ParameterValues.

The processes of Claim 10, Claim 11, Claim 12, Claim 13, and Claim 14 form a codeless visual programming approach. FIG. 9 to FIG. 14 show an example doing codeless visual programming by this approach.

Figure 14:
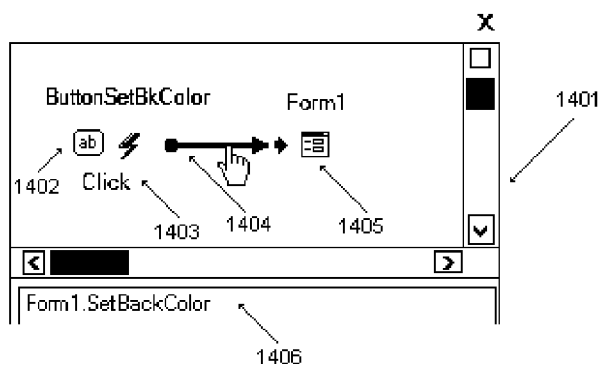

Step 1 (FIG. 9): form designer 901 provides visual UI design and codeless programming; right-click the button 902, a context menu appears, select menu "Assign Action" 903 and select event "Click" 904;

Step 2 (FIG. 10): action selection dialogue 1001 appears; this dialogue box allows selecting an existing action or selecting an action method to create a new action; for this example, the user selects BackColor property of the form as the action method, using process of Claim 13. To select BackColor property of the form, first locate form 1002, then locate instance members 1003 of the form, then from the properties 1004, select BackColor 1005;

Step 3 (FIG. 11): Action properties can be visually set via a property grid 1101. Property 1102 is the value to be assigned to BackColor. A dropdown list 1103 allows choosing constant, a property, or to form an expression for the value. For this example, a constant is used;

Step 4 (FIG. 12): in property grid 1201, selecting constant for value 1202, a color selection 1203 appears. The drawing is black and white; the actual color selection shows colors in each box. Click on a color to make selection;

Step 5 (FIG. 13): in property grid 1301, selected color appears in value 1302. Click button 1303 to finish creating this action and assigning this action to the Click event of the button;

FIG. 14 shows an event-action assignment diagram 1401. It shows that button 1402 has a Click event 1403. There is a line 1404 goes from event 1403 to an object 1405. This line indicates that when the Click event occurs, the object 1405 will do something. Action 1406 indicates what will be executed when the event occurs. In this case, when event Click occur action Form1.SetBackColor will be executed. We can see that this programming task is accomplished in Visual Studio without text coding.

INDUSTRIAL APPLICABILITY

A state-of-art graphic Integrated Development Environment has to rely on text code programming because its visual object manipulation ability is limited to specifically designed objects. By implementing this invention, a state-of-art IDE may expand its visual object manipulation ability to all software objects, not just specifically designed objects. By implementing this invention, new codeless programming IDE can be created because all software objects can be visually manipulated, making it unnecessary to use text code programming.

Embodiments of present invention show these and other advantages. Those skilled in the art may make variations and modifications to the above embodiments based on concepts of present invention. Those skilled in the art may implement the concepts of present invention on platforms and in computer languages other than platforms and computer languages used by embodiments of present invention. This invention is not limited to particular embodiments, but includes all implementations making use of concepts disclosed in specification, embodiments, drawings and claims of present invention.

What is claimed is:

1. A method for creating a process of visual manipulations of objects of all kinds of software types in an Integrated Development Environment (IDE), said process includes adding any kinds of types to a toolbox, including types not derived from a specific class, not implementing specific interfaces, generic types and types without parameter-less constructors, said process includes design-time object creation from a toolbox, said process prepares objects so that an IDE can visually manipulate objects of any kinds of types, including types not derived from a specific class, not implementing specific interfaces, generic types and types without parameter-less constructors, said process includes a component, where the component is called XClass, XClass is designed to meet all requirements for it to be able to be visually manipulated and added to a toolbox by a state-of-art IDE, XClass represents an object being programmed, type of object being programmed is called "object-type", XClass includes information for "object-type", constructor of an object being programmed, and "object-property-values", where "object-property-values" include values for properties of "object-type", constructor of object being programmed, values for constructor parameters, and values of type parameters if "object-type" is a generic type; said process includes a process of adding new toolbox items: an IDE maintains a type-map, where the type-map is a dictionary of types, said dictionary uses string as key, to add a new toolbox item for a type to a toolbox, the IDE adds said type to type-map by generating an unique key based on name of said type, the IDE creates a new toolbox item using type XClass, said new toolbox item uses said key as its display text, said process includes a process of creating object instance by selecting a toolbox item: a user selects a toolbox item for creating an object instance in programming, an XClass object instance is created, an IDE locates a type from said type-map using display text of the selected toolbox item as dictionary key, the located type is passed to said XClass object instance as its "object-type", if the located type is a generic type definition then the IDE shows a type-selection dialogue box for user to specify types for type parameters, if the located type has more than one constructor then the IDE shows all the constructors for user to select one constructor and its constructor-parameters, if the located type has only one constructor with one or more parameters then the IDE allows user to specify constructor-parameters.

2. The method of claim 1, further comprising of a process of forming a list of design time visually-manipulated properties of an XClass object instance by properties of the "object-type" of said XClass object instance, type parameters of the "object-type", constructor and constructor parameters of the "object-type".

3. The method of claim 2, further comprising of a process of design time object property setting: a user selects an XClass object instance in an IDE, the IDE shows the list of design time visually-manipulated properties of said XClass object instance in a visual editor to let user visually view and edit properties, the property values user entered through visual editing are stored in "object-property-values" of said XClass object instance, the IDE saves "object-property-values" to computer data storage when saving the programming and loads "object-property-values" from said storage when loading the programming.

4. The method of claim 2, further comprising of a process of design time object property selection: a user selects an XClass object instance in an IDE, the IDE presents the "design time visually-manipulated properties" of said XClass as defined in claim 3, the user makes a selection from said properties.

5. The method of claim 1, further comprising of a process of design time object method selection: a user selects an XClass object instance in an IDE, the IDE presents methods of "object-type" of said XClass, the user makes a selection from said methods.

6. The method of claim 1, further comprising of a process of design time object event selection: a user selects an XClass object instance in an IDE, the IDE presents events of "object-type" of said XClass, the user makes a selection from said events.

7. The method of claim 6, further comprising of a method for creating a process of visual and codeless event handling in an Integrated Development Environment (IDE), said process includes visual event selection using the method of claim 6 to select an event to be handled; said event handling is formed by a set of object instances and developed by setting properties of said object instances, where said object instances are called Action instances.

8. The method of claim 7 further comprising a type, where the type is for an Action class, an Action has a Condition as its member for indicating under which condition the action is can be executed, an Action has an Action-method as its member indicating an operation to be carried out, an Action has additional properties for providing parameter values required by said Action-method, an Action has a return value indicating where to save the method return value.

9. The method of claim 8, where the Action-method of the Action type of claim 8 is an instance method of an object or a static method of a type, said Action has a property for each method parameter, at compiling time said Action is compiled into method-invocation code using the specified method, return value, and method-parameters.

10. The method of claim 8, where the Action-method of the Action type of claim 8 is an instance property of an object or a static property of a type, said Action has a "value" property for providing value; at compiling time said Action is compiled into property-setting code, the property to set is the property represented by the Action-method, the "value" property of the Action is the value passed to the property.

11. The method of claim 8, where the Action-method of the Action type of claim 8 is can be an instance event of an object or a static event of a type, said Action has a property for each event parameter, at compiling time said Action is compiled into event-firing code using the specified event and event-parameters.

12. The method of claim 8 further comprising a process of visual action creation, said action creation process includes method selection process, selected method becomes the action method, the action of claim 8 becomes a method-invoking action, parameters of selected method become part of properties of the action; said action creation process includes an event selection process, selected event becomes the action method, the action of claim 8 becomes an event-firing action, event parameters of selected event become part of properties of the action; said action creation process includes a property selection process, but property list for making property selection only contains runtime writable properties, the selected property becomes the action method, the action of claim 8 becomes a property-setting action, a property is added to the action for specifying value to be set to the selected property.

* * * * *